United States Patent Office 3,168,545
Patented Feb. 2, 1965

3,168,545
SUBSTITUTED 1-ISOCYANATO-ETHOXY
COMPOUNDS
James L. Harper, Laurel, Md., assignor to W. R. Grace &
Co., a corporation of Connecticut
No Drawing. Filed Sept. 27, 1962, Ser. No. 228,780
2 Claims. (Cl. 260—453)

This is a continuation-in-part of application Serial No. 178,231 filed March 8, 1962, now abandoned.

This invention relates to organic isocyanate compounds and to a process for preparing the same.

Numerous organic isocyanate compounds are known to the art. They have a wide variety of uses in the arts relating to the resins; plastics; coatings; insecticides; adhesives; and modification of fibers, sheets and films composed of cloth, leather and paper. A variety of methods for producing organic isocyanates are also well known to the art. Such methods include, for example, the reaction of amines or amine salts with phosgene, the Curtius rearrangement of an azide in a neutral solvent, the Hoffman rearrangement of amides, the Lossen rearrangement of hydroxamic acids and the double decomposition reaction between an organic halide or sulfate and an alkali metal cyanate. More recent proposals include the reaction of organic isocyanides and ozone.

It is an object of this invention to provide a new and simplified method for preparing organic isocyanates. It is another object of this invention to provide hitherto unknown isocyanates. Still other objects will become apparent to those skilled in the art in view of the more detailed disclosure which follows.

The new class of organic isocyanates described in this invention have one of the following general formula:

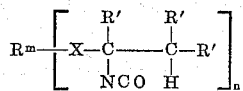

In the above formula X is a strongly electron-donating substituent such as divalent oxygen or sulfur. R may be a mono or multivalent saturated or ethylenically unsaturated hydrocarbon radical having a valence of from 1 to 6 which includes alkyl, alkylene, cycloalkyl, cycloalkylene, aryl, alkylaryl, arylalkyl, and alkenyl. Furthermore, R may be an oxygen or sulfur-containing radical such as alkoxyalkyl, aryloxyalkyl, alkenyloxyalkyl, alkenylthioalkyl, alkenyloxypolyalkyloxyalkyl and alkenylthiopolyalkylthioalkyl. Still further R may be an alkylene radical which forms a heterocyclic ring with a carbon atom adjacent to the isocyanate substituted carbon atom. It is also envisioned that R may possess non-interfering substituents such as nitro and halo radicals.

As shown in the above formula, R has a valence, $m$, which may have a value of from 1 to 6. The number of substituents placed on R is represented by $n$ which has a value equal to $m$.

R′ is hydrogen or an organic radical such as alkyl, aryl, any of which may possess non-interfering substituents such as halo or nitro radicals. Furthermore, R′ may represent a divalent alkylene radical which forms a heterocyclic ring with a valence of R.

The broad general formula given above may be redefined in terms of several less broad sub-generic formulae to more clearly illustrate the wide scope of the present invention. These formulae are as follows:

(I)

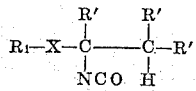

In this formula $R_1$ represents a monovalent organic radical which may be selected from the group previously defined for R. Typical values for $R_1$ are branches or straight chain alkyl, cycloalkyl, aryl, alkoxyalkyl, aryloxyalkyl, and alkenyl. As given previously, X may be oxygen or sulfur and R′ is hydrogen or a monovalent organic radical as previously defined.

(II)

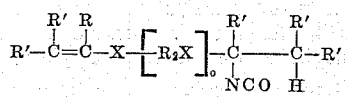

In this formula R′ represents hydrogen or monovalent organic radicals as previously defined, and X is oxygen or sulfur. $R_2$ is a divalent hydrocarbon radical such as alkylene or arylene. The subscript $o$ represents the number of —$R_2X$— repeating units and has a value of from 1 to about 100.

(III)

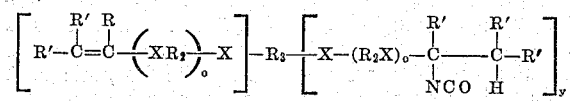

In the above R′ and $R_2$ represent organic radicals as previously defined. X is oxygen or sulfur and $o$ has a value of from 1 to about 100. $R_3$ is a polyvalent hydrocarbon radical having a valence of from 2 to 6 and includes polyvalent saturated and ethylenically unsaturated hydrocarbon radicals having less than about 20 carbon atoms. $x$ and $y$ represent integers having a sum equal to the valence of $R_3$ with $y$ being equal to at least 1.

(IV)

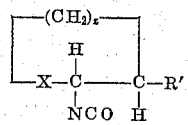

R′ is hydrogen or a monovalent organic radical as previously defined and X represents oxygen or sulfur. $z$ has a value of from 2 up to about 10.

In general, the isocyanates of this invention are prepared by reacting isocyanic acid with an ethylenic compound in which an ethylenic carbon atom carries a strongly electron-donating substituent such as oxygen and sulfur. Subsequent to reaction, the desired isocyanate is separated from the reaction mixture by conventional distillation or crystallization procedures.

The ethylenic compounds which may be reacted to obtain the compounds of the present invention have the generic formula—

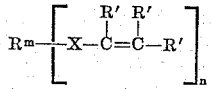

wherein R, R′, X, $m$ and $n$ have the meanings given previously.

More specifically the general formulae of ethylenic compounds which may be reacted with isocyanic acid to obtain the compounds of Formulae I to IV are as follows:

(V) 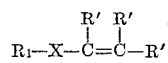

(VI) 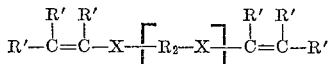

(VII) 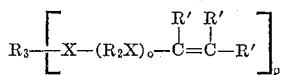

(VIII) 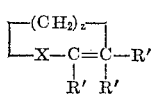

respectively, where $R_1$, $R_2$, $R_3$, $R'$, $X$, $o$ and $z$ have the meanings given previously and $p$ has a value of from 2 to 6. It will be noted that in each of the starting materials there is a strong electron-donating group immediately adjacent to the ethylenic group

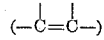

Although it is not desired to be bound by theoretical considerations, it is believed that this structure of the starting materials is the principal factor which permits the present reaction to proceed. Furthermore, in order for isocyanate addition to occur at the ethylenic linkage, the ethylenic group should not be sterically hindered by the presence of bulky, interfering substituents.

Specific examples of radicals which may be used for R, $R'$, $R_1$, $R_2$ and $R_3$ are as follows: Typical monovalent radicals are methyl, ethyl, propyl, butyl, octyl, nonyl, decyl, undecyl, dodecyl, hexadecyl, octadecyl, eicosyl, phenyl, tolyl, benzyl, cyclohexyl, cyclopentyl, cycloheptyl, cyclooctyl, methylphenyl, ethylphenyl, propylphenyl, phenylethyl, 1-phenylpropyl, 2-phenylpropyl, 1-phenylbutyl, vinyloxybutyl, vinylthiobutyl, or the like. It is to be understood that these radicals may also contain various substituents which are nonreactive with isocyanic acid, such as halogen atoms (i.e., fluorine, chlorine, bromine, or iodine) or nitro, cyano, or alkoxy groups or the like.

Typical divalent radicals are substituted or unsubstituted alkylene, cycloalkylene, arylene, aralkylene and alkarylene radicals containing not more than about 20 carbon atoms and preferably from 1 to about 10 carbon atoms. Examples of such radicals are methylene, ethylene, propylene, trimethylene, tetramethylene, pentamethylene, hexamethylene, decamethylene, dodecamethylene, hexadecamethylene, octadecamethylene, 2-methyltetramethylene, 1-, 2-, or 3-methylpentamethylene, 2-ethylhexamethylene, 3 - butyloctamethylene, cyclopentylene, cyclohexylene, cycloheptylene, cyclooctylene, phenylene, ortho-, meta-, and para-tolylene, dimethylphenylene, ethylphenylene, diethylphenylene, anthrylene, phenylethylene, phenylpropylene, 1- or 2-phenyltrimethylene, 1- or 2-tolyltetramethylene, 3-phenyltetramethylene, and 3-tolyltetramethylene radicals or the like. Permissible substituents include halogen, cyano, etc. similarly as those mentioned above for the monovalent organic hydrocarbon radicals.

The starting materials shown by Formula VII above comprise vinyl ethers or vinyl thioethers of polyalkylene ether polyols or polyalkylene ether-thioether polyols. These polyols are prepared by methods known to the art. For example, polyalkylene ether polyols are prepared by reacting a non-polymeric polyol with ethylene oxide, propylene oxide, or a mixture of oxides either at the same time or in sequence. Examples of non-polymeric polyols which can be reacted in this manner are diols such as ethylene glycol, propylene glycol, thiodiglycol, 1,3-propanediol, 1,3-butanediol, 1,4-butanediol, 2,3-butanediol, 1,5-pentanediol, 1,6-hexanediol, 2-methyl-1,3-pentanediol, 2,3-dimethyl-2,3-butanediol, 2,4-heptanediol, 2,2-diethyl-1,3-propanediol and the like; and higher polyols such as glycerol, trimethylolpropane, erythritol, pentaerythritol, mannitol, sorbitol, dipentaerythritol, ribitol, xylitol, inositol and the like. From one to about 100 moles of ethylene and/or propylene oxide are added to each hydroxyl group present in the polyol. Ordinarily the product of the reaction is not a specific single compound, but rather is a mixture of compounds wherein the length of the individual oxyalkylene chains $(R_2O)_o$ in the individual molecules is varied. Thus $o$ in the general Formula VII represents the average number of oxyalkylene groups in the reaction product. Polyalkylene ether-thioether glycols and other like polyols can be prepared in accordance with the teachings of U.S. Patent 2,900,368. In these compounds X represents both oxygen and sulfur atoms, so that the chains $(R_2X)_n$ contain both $—R_2O—$ and $—R_2S—$ groups in random or fixed distribution. The vinyl ether derivatives of polyalkylene ether polyols and polyalkylene ether-thioether glycols are prepared by reaction with acetylene in the presence of an alkaline catalyst. This reaction and may of the products thereby obtained are known to the art.

Typical examples of ethylenic compounds falling within the scope of Formulae V, VI and VIII, which are suitable starting materials, include vinyl ethers and divinyl ethers such as dihydrofuran, dihydropyran, ethyl vinyl ether, sec-butyl vinyl ether, divinyl ether, divinyl ethers of diols such as ethylene glycol, 1,3-propanediol, 1,4-butanediol, 1,5-pentanediol; ethyl isopropenyl ether

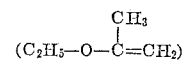

and the like; vinyl thioethers and divinyl thioethers in which the oxygen atom(s) of the above vinyl ethers are replaced by sulfur atom(s).

The reaction between isocyanic acid and ethylenic compounds of the Formulae V through VIII above is typified by the following general reaction equation; where the vinyl compound is an ether

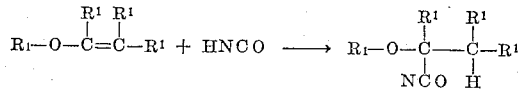

where $R_1$, $R^1$, $R^1$, and $R^1$ are the same as previously defined. Unreacted starting materials are readily separated by known techniques, e.g., distillation, to yield essentially pure organic isocyanate product.

The amounts of respective starting materials is not critical. Obviously, the isocyanic acid must be present in amounts sufficient to yield some product. Generally speaking, in preparing the monoisocyanates of the invention from mono-ethylenic starting materials, the mole ratio of ethylenic compound to isocyanic acid is in the range of from about 10 to about 1 and preferably between about 5 and about 1. Use of excess amounts of ethylenic compound provides an excellent reaction medium or diluent and does not detract from the overall efficiency of the process since the excess ethylenic compound can be separated, recovered, and recycled. In the preparation of di- and polyisocyanates it is usually preferred to use approximately stoichiometric amounts of isocyanic acid and the ethylenic starting material and to conduct the reaction in the presence of an inert solvent, e.g., toluene. Furthermore, when it is desired to obtain a partially isocyanated derivative of polyethylenic compound, a mole ratio of isocyanic acid to ethylene compound corresponding to the number of ethylenic groups to be substituted is used.

Since the reaction proceeds quite satisfactorily at ambient pressures, such pressures will ordinarily be preferred. Superatmospheric or subatmospheric pressures may be used if desired, but do not materially enhance the reaction rate or product yield and thus will usually be found uneconomical. As will be obvious, the pressure during the reaction must be sufficient to avoid volatilization of either of the starting materials, especially the isocyanic acid reactant, as this materially reduces the reaction efficiency.

The reaction can be conducted at temperatures in the range of from about minus 10° centigrade to about 130° centigrade. Preferably the temperature of the reaction mass is maintained between about 0° centigrade and 100° centigrade. Optimum reaction temperature and pressure for any particular ethylenic compound can be easily determined by routine empirical methods.

The reaction may be conducted in an inert liquid organic diluent (which may be a solvent) if desired. Diluents which can be used include aliphatic, cycloaliphatic or aromatic hydrocarbons and halogen substituted hydrocarbons such as n-hexane, n-heptane, decane, benzene, toluene, xylene, carbon tetrachloride, chlorobenzene, cyclopentane, cyclohexane, trichlorobenzene or the like. The choice of any specific suitable diluent will be obvious to the skilled organic chemist. As previously stated, for preparing monoisocyanates, it is most convenient to use an excess of the ethylenic compound as the reaction diluent.

The time required for the reaction varies according to the particular ethylenic compound, reaction temperature, etc. For any specific ethylenic compound longer reaction times are required at lower temperatures than at higher temperatures. In all cases, significant yields of the desired isocyanate product are obtained in about 24 hours or less.

Means of separating isocyanate product from unreacted starting materials and inert diluent (if used) will be readily apparent to a skilled chemist. One very satisfactory method of separating is fractional distillation of the reaction product mass. Other suitable methods, depending upon the state (i.e., liquid or solid) of the ethylenic compound and of the isocyanate product, include filtration, sublimation, fractional crystallization, etc. Because of its general applicability, fractional distillation will usually be the preferred method for separation.

The new monoisocyanato compounds of this invention have utility in applications similar to those of known monoisocyanato compounds, e.g., as treating agents for textiles, paper and leather and as intermediates for preparing a wide range of other useful compounds such as urethanes, disubstituted ureas, etc. The new diisocyanates and other polyisocyanates are useful in the resins and plastics industry as precursors for preparing adhesive compositions, as well as solid and foamed polyurethanes, polyureas and other like polymers.

The invention is illustrated by the following specific examples.

EXAMPLE 1

*Preparation of 2-isocyanatotetrahydropyran*

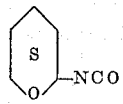

A 325-gram portion of a solution containing 12 percent by weight of isocyanic acid dissolved in dihydropyran (also know as dihydro-4H-pyran according to Kirk-Othmer, Encyclopedia of Chemical Technology, vol. 7 (1951) pages 445–46) was permitted to stand for 24 hours at room temperature (about 18–22° centigrade), and then refluxed for two hours. The white solid precipitate thereby formed (33 grams) was filtered out of the solution. This precipitate was analyzed and found to be by-product cyanuric acid.

The filtrate was distilled to remove excess dihydropyran and the liquid residue which remained was purified by fractional distillation under vacuum in a Claisen flask to yield 17 grams of product. This yield represents a 10 percent conversion or a 93 percent yield, based on isocyanic acid used.

The 1-isocyanatotetrahydropyran product had a boiling point of 51–52% centigrade at 7 millimeters of mercury, absolute. Elemental analysis gave the following results:

|  | Weight Percent | |
|---|---|---|
|  | Found | Theoretical |
| Carbon | 56.68 | 56.60 |
| Hydrogen | 7.16 | 7.13 |

The infra-red absorption spectrum of the product agreed with the structure shown in the heading of this example. In order to characterize further this product, it was mixed with aniline and gave a solid disubstituted urea, melting point 190–191° centigrade. Upon elemental analysis, the following results were obtained:

|  | Weight Percent | |
|---|---|---|
|  | Found | Theoretical |
| Carbon | 65.82 | 65.42 |
| Hydrogen | 7.40 | 7.32 |
| Nitrogen | 12.54 | 12.72 |

The infra-red absorption spectrum of the disubstituted urea also agreed with the proposed structure:

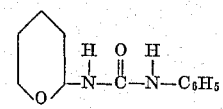

EXAMPLE 2

*Preparation of 1-ethoxy-1-isocyanatoethane*

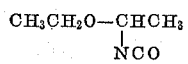

In this example, 195 grams of a solution containing 25.6 percent by weight (51 grams) of isocyanic acid in ethyl vinyl ether was allowed to stand overnight (about 16 hours) at room temperature and then refluxed for 8 hours. By-product cyanuric acid (23 grams) was removed by filtration and the remaining filtrate was then distilled at a reflux ratio of 5 to 1 in a Todd column with a spiral packing. After excess ethyl vinyl ether was removed, 60 grams of liquid 1-ethoxy-1-isocyanatoethane product was collected. This represents a conversion of 44 percent and a yield of 80 percent based on isocyanic acid.

The product had a boiling point of 110–111° centigrade at 760 millimeters of mercury, absolute. The infrared spectrum of this material agreed with the proposed structure. Elemental analysis of the product gave the following results:

|  | Weight Percent | |
|---|---|---|
|  | Found | Theoretical |
| Carbon | 52.59 | 52.16 |
| Hydrogen | 7.89 | 7.88 |
| Nitrogen | 12.50 | 12.17 |

EXAMPLE 3

*Preparation of 1-(1-isocyanatoethoxy)-2-methylpropone*

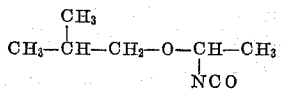

286 grams of a solution containing 86 grams of isocyanic acid dissolved in isobutyl vinyl ether was permitted to stand overnight (about 16 hours) at room temperature and then refluxed for two hours. By-product cyanuric acid (55 grams) was removed by filtration. The filtrate was then distilled in the same manner described in Example 2 to give 83 grams of the desired product. This represents a conversion of 29 percent and a yield of 80 percent on the basis of isocyanic acid.

The 1-(1-isocyanatoethoxy)-2-methyl propane product had a boiling point of 54–55° centigrade at 24 millimeters of mercury, absolute. Results of infrared analysis showed that the proposed structure was correct. The following results were obtained from elemental analysis of the material:

|  | Weight Percent | |
| --- | --- | --- |
|  | Found | Theoretical |
| Carbon | 58.60 | 58.72 |
| Hydrogen | 9.18 | 9.15 |
| Nitrogen | 10.02 | 9.78 |

EXAMPLE 4

*Preparation of 1-(1-isocyanatoethoxy)-butane*

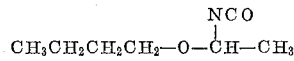

By using the same procedures as those described in the preceding examples isocyanic acid was reacted with n-butyl vinyl ether to produce 1-(1-isocyanatoethoxy)-butane. This product has a boiling point of 62–63° centigrade at 24.7 millimeters of mercury, absolute. Elemental analysis gave the following results:

|  | Weight Percent | |
| --- | --- | --- |
|  | Found (average of two analyses) | Theoretical |
| Carbon | 58.62 | 58.72 |
| Hydrogen | 9.07 | 9.15 |
| Nitrogen | 9.84 | 9.78 |

EXAMPLE 5

*Preparation of 1-(1-isocyanatoethoxy)-2-ethylhexane*

$$CH_3CH-O-CH_2-C-(CH_2)_3-CH_3$$
$$\quad\quad |\quad\quad\quad\quad |$$
$$\quad NCO \quad\quad\quad C_2H_5$$

The procedures described in the preceding examples were used to prepare 1-(1-isocyanatoethoxy)-2-ethylhexane by reaction of isocyanic acid with 1-vinyloxy-2-ethylhexane. The product was recovered by fractional distillation and identified by infrared and elemental analyses.

EXAMPLE 6

*Preparation of 1,4-bis(1-isocyanatoethoxy)-butane*

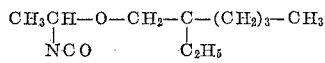

34.0 grams of 1,4-bis-(vinyloxy)-butane were dissolved in 308.4 grams of a solution containing 9.5 percent by weight of isocyanic acid in toluene. The final solution was refluxed for 2 hours. The by-product cyanuric acid was then filtered out and toluene was removed by distillation. Further distillation at under reduced pressures removed the unreacted divinyl ether and yielded 19 grams of product.

The recovered 1,4-bis-(1-isocyanatoethoxy)-butane had a boiling point of 80–81° centigrade at 0.275 millimeter of mercury, absolute, and gave an infrared spectrum which agreed with the proposed structure.

Elemental analysis gave the following results:

|  | Weight Percent | |
| --- | --- | --- |
|  | Found | Theoretical |
| Carbon | 52.40 | 52.62 |
| Hydrogen | 7.43 | 7.07 |
| Nitrogen | 12.33 | 12.28 |

The one-pass yield of 1,4-bis(1-isocyanatoethoxy)-butane from isocyanic acid and 1,4-bis(vinyloxy)-butane was 81% (based on the divinyl ether starting material).

The diisocyanate products described in this example have have been used to prepare polyurethanes and polyureas by reaction with a polyether having free hydroxyl groups and a polyamine, respectively.

EXAMPLE 7

*Preparation of 1-(1-isocyanatoethoxy)-4-vinyloxy-butane*

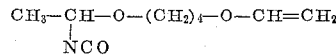

A mixture of 215 cc. of toluene containing 21.5 g. (0.5 mole) of HNCO and 1,4-bis(vinyloxy)-butane (71.0 g., 0.5 mole) was placed in a 500 cc. flask. A condenser, cooled with a Dry-Ice acetone mixture, was attached, the entire system was flushed out with nitrogen, and placed in an oil bath maintained at 90±0.5° C. for three hours. The temperature of the reaction mixture rose from —20° C. to 90° C. in 35 minutes and remained there for the remainder of the three hours. The toluene was removed under vacuum, leaving 85.0 grams of residue. Distillation of a 70.0 gram aliquot of the residue through an unpacked Todd column, using a 5:1 reflux ratio, gave the following fractions:

| Fraction | Boiling Point/Pressure | Amount, grams |
| --- | --- | --- |
| I | 38–41° C./2.5 mm | 6.9 |
| II | 58–59° C./1.0 mm | 4.3 |
| III | 50° C./0.25 mm | 10.3 |
| IV | 50–51° C./0.25 mm | 19.2 |
| V | 55–80° C./0.275 mm | 4.9 |
| VI | 80–81° C./0.275 mm | 13.9 |
| Residue | | 6.5 |

Infrared analysis of the above samples showed I to be unchanged divinyl ether, II, III and IV to be the desired monoisocyanate and VI to be pure diisocyanate.

Elemental analysis of fraction IV (pure monoisocyanate) gave the following results:

|  | Calc. for $C_9H_{15}NO_3$ | Found |
| --- | --- | --- |
| Percent C | 58.36 | 58.52 |
| Percent H | 8.16 | 8.10 |
| Percent N | 7.56 | 7.51 |

The disubstituted urea made by reacting this material with aniline possessed a melting point of 88–89° C. and gave the following elemental analysis:

|  | Calc. for $C_{15}H_{22}N_2O_3$ | Found |
| --- | --- | --- |
| Percent C | 64.72 | 64.71 |
| Percent H | 7.97 | 7.94 |
| Percent N | 10.07 | 10.07 |

What is claimed is:
1. A compound of the formula

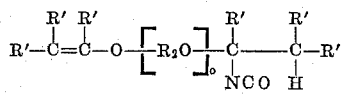

wherein R′ is selected from the group consisting of hydrogen and alkyl having from about 1 to about 20 carbon atoms; $o$ has a value of from about 1 to 100; and $R_2$ is selected from the group consisting of alkylene having from about 1 to about 20 carbon atoms and phenylene.

2. The compound 1-(1-isocyanatoethoxy)-4-vinyloxybutane.

References Cited by the Examiner

UNITED STATES PATENTS

| | | | |
|---|---|---|---|
| 2,647,884 | 8/53 | Wystrach | 260—453 X |
| 2,727,020 | 12/55 | Melamed | 260—453 X |
| 3,049,552 | 8/62 | Garber | 260—347.8 X |
| 3,076,788 | 2/63 | Hoover | 260—345.1 X |

OTHER REFERENCES

Siefkin: Annalen der Chemie, volume 562, pages 75–136 (1949).

CHARLES B. PARKER, *Primary Examiner.*

NICHOLAS S. RIZZO, *Examiner.*